United States Patent
Nimura et al.

(10) Patent No.: US 10,349,453 B2
(45) Date of Patent: Jul. 9, 2019

(54) COMMUNICATION APPARATUS, COMMUNICATION SYSTEM, COMMUNICATION METHOD AND RECORDING MEDIUM

(71) Applicant: CASIO COMPUTER CO., LTD., Tokyo (JP)

(72) Inventors: Ryo Nimura, Fussa (JP); Takehiko Kii, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/865,410

(22) Filed: Jan. 9, 2018

(65) Prior Publication Data
US 2018/0213581 A1  Jul. 26, 2018

(30) Foreign Application Priority Data

Jan. 23, 2017 (JP) ................ 2017-009668

(51) Int. Cl.
| | | |
|---|---|---|
| *H04W 76/12* | (2018.01) | |
| *H04W 76/15* | (2018.01) | |
| *H04W 80/06* | (2009.01) | |
| *G09B 19/04* | (2006.01) | |
| *H04W 84/12* | (2009.01) | |

(Continued)

(52) U.S. Cl.
CPC ............ *H04W 76/12* (2018.02); *G09B 19/04* (2013.01); *H04W 76/15* (2018.02); *H04W 80/06* (2013.01); *G09B 5/065* (2013.01); *G09B 19/06* (2013.01); *H04W 84/12* (2013.01)

(58) Field of Classification Search
CPC combination set(s) only.
See application file for complete search history.

(56) References Cited

U.S. PATENT DOCUMENTS

| 9,231,907 | B2 * | 1/2016 | Yoshino | ............... H04L 67/141 |
| 2005/0177646 | A1 * | 8/2005 | Kawano | ............ H04L 29/12009 709/245 |

(Continued)

FOREIGN PATENT DOCUMENTS

| JP | 2006-279431 A | 10/2006 |
| JP | 2008-236470 A | 10/2008 |

(Continued)

*Primary Examiner* — Dady Chery
(74) *Attorney, Agent, or Firm* — Scully Scott Murphy & Presser

(57) ABSTRACT

A first communication apparatus includes a processor, and a memory storing instructions. The instructions causes the processor to: transmit first connection request information, which includes information of a network address of the first communication apparatus, information of a code indicative of communication with a second communication apparatus, and information of a port number for the communication, to one or more apparatuses being connected to a network which the first communication apparatus is connected to; receive second connection request information which is information that the second communication apparatus transmits to the network address in response to reception of the first connection request information; and establish a connection to the second communication apparatus.

14 Claims, 10 Drawing Sheets

(51) Int. Cl.
    *G09B 19/06*        (2006.01)
    *G09B 5/06*         (2006.01)

(56) References Cited

U.S. PATENT DOCUMENTS

| | | | | |
|---|---|---|---|---|
| 2007/0160192 A1* | 7/2007 | Horio | ............ | H04M 3/56 |
| | | | | 379/338 |
| 2007/0255784 A1* | 11/2007 | Takechi | ............ | H04L 67/14 |
| | | | | 709/203 |
| 2012/0015602 A1* | 1/2012 | Murakami | ............ | H04B 7/155 |
| | | | | 455/7 |
| 2013/0138824 A1* | 5/2013 | Yoshino | ............ | H04L 67/141 |
| | | | | 709/228 |

FOREIGN PATENT DOCUMENTS

| | | |
|---|---|---|
| JP | 2012-134703 A | 7/2012 |
| JP | 2013-020030 A | 1/2013 |

* cited by examiner

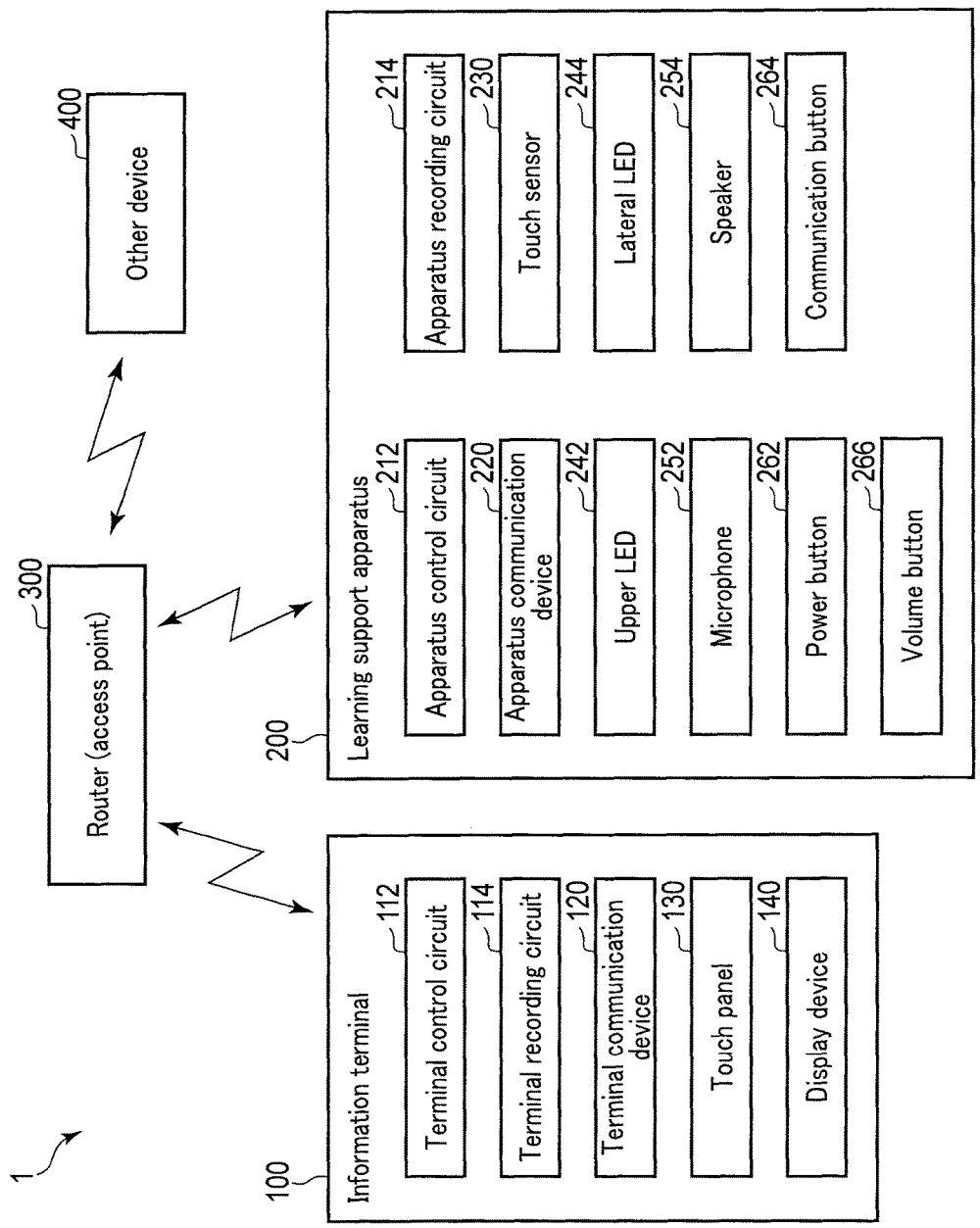
F I G. 1

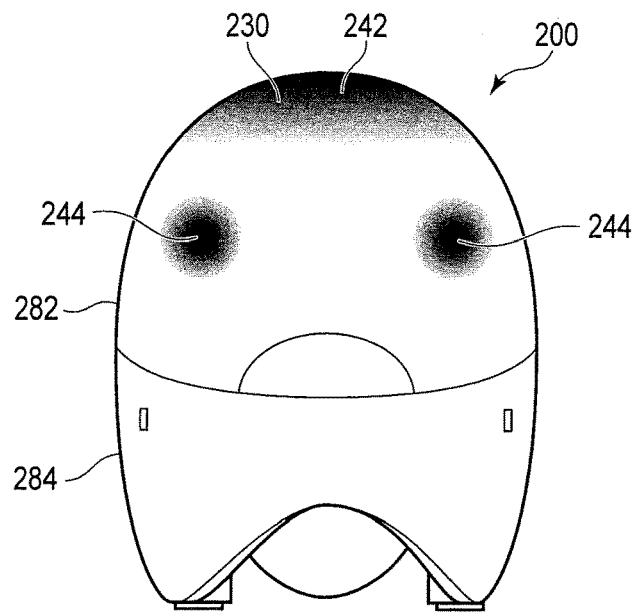
F I G. 2A
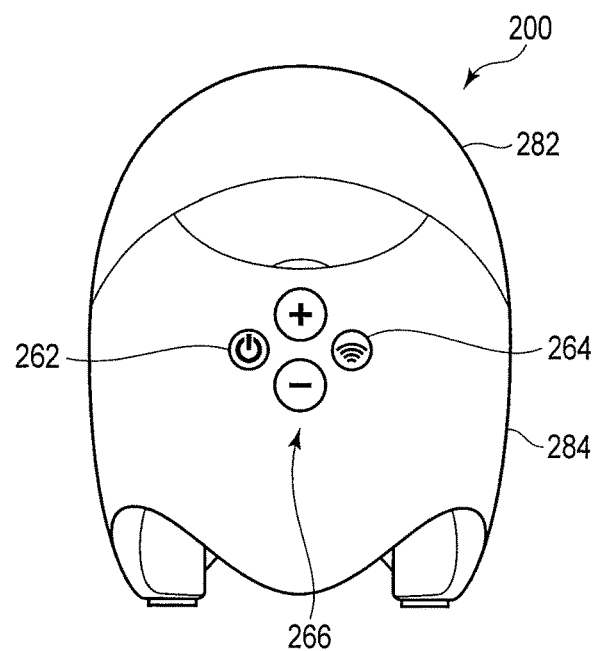
F I G. 2B

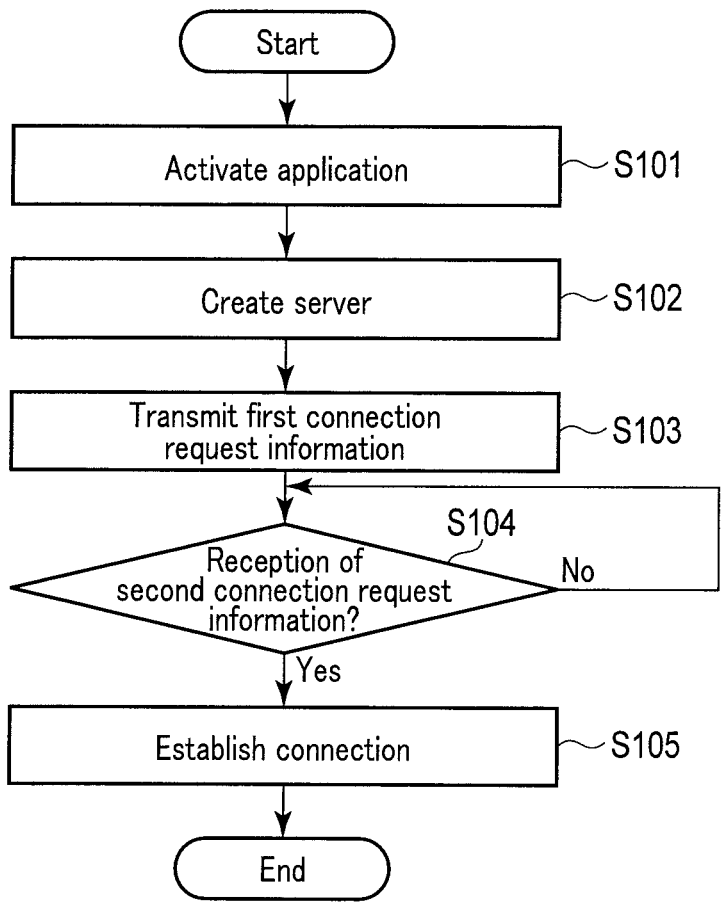
F I G. 3

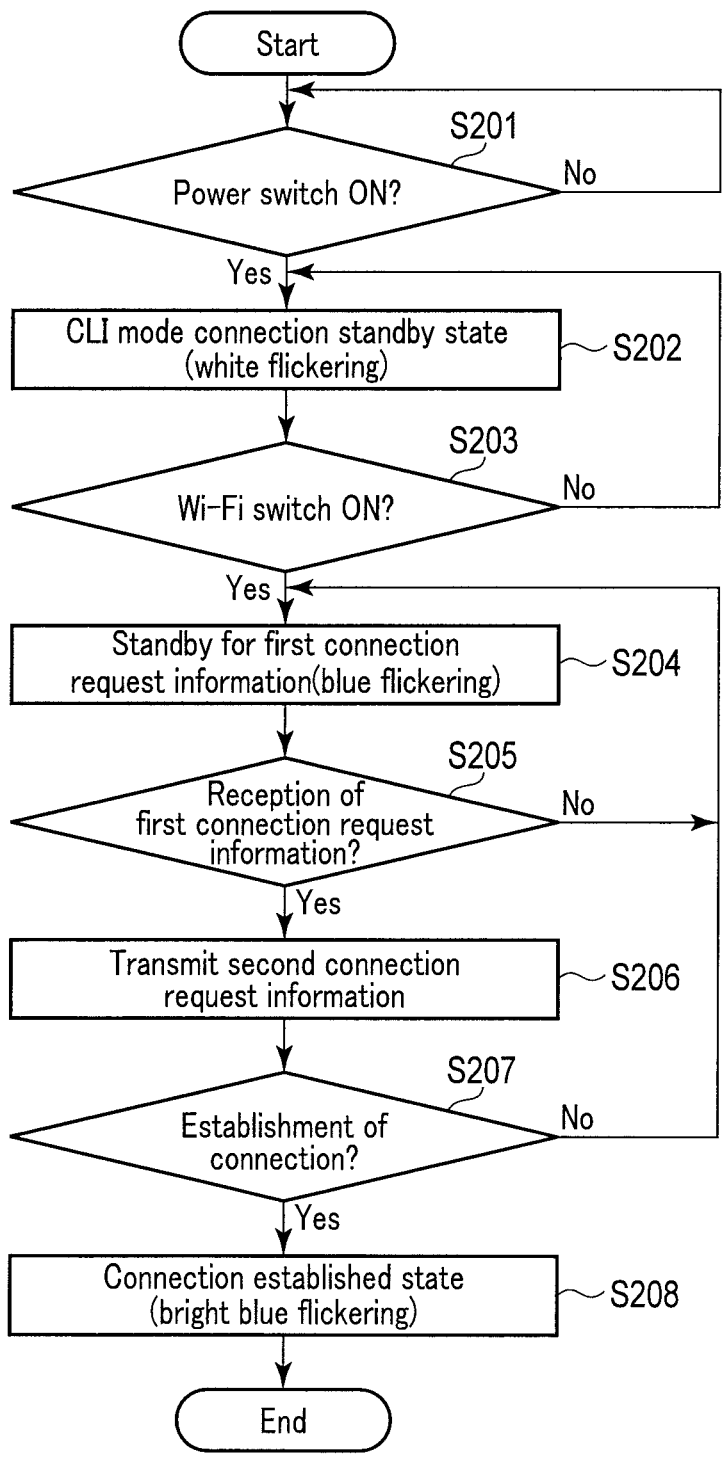
F I G. 4

COMMUNICATION APPARATUS, COMMUNICATION SYSTEM, COMMUNICATION METHOD AND RECORDING MEDIUM

CROSS-REFERENCE TO RELATED APPLICATIONS

This application is based upon and claims the benefit of priority from prior Japanese Patent Application No. 2017-009668, filed Jan. 23, 2017, the entire contents of which are incorporated herein by reference.

BACKGROUND OF THE INVENTION

1. Technical Field

The technical field relates to a communication apparatus, a communication system, a communication method and a recording medium.

2. Description of Related Art

There is known an electronic apparatus (learning support apparatus) for learning such as an English conversation while having a dialogue with a user. Jpn. Pat. Appln. KOKAI Publication No. 2013-020030, for instance, discloses a technique relating to an apparatus which can conduct a dialogue-type conversion by using various conversation data prepared in advance by an audio data compression method or the like, such as MP3. For example, if this learning support apparatus communicates with an information terminal such as a smartphone, the possibility of operations as the entire system increases. In order to construct a system by the learning support apparatus and the information terminal communicating with each other, it is necessary that the learning support apparatus and the information terminal be exactly connected.

BRIEF SUMMARY OF THE INVENTION

According to an aspect of the invention, a communication apparatus comprises a processor, and a memory storing instructions. When the processor executes the instructions, the instructions cause the processor to: transmit first connection request information, which includes information of a network address of the communication apparatus, information of a code indicative of communication with at least one first communication apparatus, and information of a port number for the communication, to one or more apparatuses which are connected to a network which the communication apparatus is connected to; receive second connection request information which is information that one of the at least one first communication apparatus corresponding to the information of the code of the first connection request information transmits to the network address of the communication apparatus in response to reception of the first connection request information; and establish a connection to the one first communication apparatus in response to reception of the second connection request information.

According to an aspect of the invention, a communication apparatus comprises a processor, and a memory storing instructions. When the processor executes the instructions, the instructions cause the processor to: receive first connection request information via a network, a first communication apparatus transmitting the first connection request information to one or more apparatuses which are connected to the network which the first communication apparatus is connected to, the first connection request information including information of a network address of the first communication apparatus, information of a code indicative of communication with the communication apparatus, and information of a port number for the communication; and transmit second connection request information to the network address of the first communication apparatus in response to determination that the communication apparatus is an apparatus corresponding to the information of the code of the first connection request information, the second connection request information being information for establishing a connection to the first communication apparatus.

According to an aspect of the invention, a communication system comprises a first communication apparatus and a second communication apparatus. The first communication apparatus comprises a first processor, and a first memory storing first instructions. When the first processor executes the first instructions, the instructions cause the first processor to: transmit first connection request information, which includes information of a network address of the first communication apparatus, information of a code indicative of communication with the second communication apparatus and information of a port number for the communication, to one or more apparatuses which are connected to a network. The second communication apparatus comprises a second processor, and a second memory storing second instructions. When the second processor executes the second instructions, the second instructions cause the second processor to: receive via the network the first connection request information which the first communication apparatus transmits; and transmit second connection request information to the network address of the first communication apparatus in response to determination that the second communication apparatus is an apparatus corresponding to the information of the code of the first connection request information, the second connection request information being information for establishing a connection to the first communication apparatus. The first processor of the first communication apparatus, under control of the first instructions, receives the second connection request information which the second communication apparatus transmits, and establishes a connection to the second communication apparatus in response to reception of the second connection request information.

According to an aspect of the invention, a communication method is a method for establishing a connection between a first communication apparatus and a second communication apparatus. The method for the second communication apparatus comprises receiving first connection request information via a network, the first communication apparatus transmitting the first connection request information to one or more apparatuses which are connected to the network which the first communication apparatus is connected to, the first connection request information including information of a network address of the first communication apparatus, information of a code indicative of communication with the communication apparatus, and information of a port number for the communication; and transmitting second connection request information to the network address of the first communication apparatus in response to determination that the communication apparatus is an apparatus corresponding to the information of the code of the first connection request information, the second connection request information being information for establishing a connection to the first communication apparatus.

According to an aspect of the invention, a non-transitory recording medium has a program recorded thereon for establishing a connection between a first communication apparatus and a second communication apparatus. The program is executable to control a computer, the computer being the second communication apparatus. The program causes the computer to: receive first connection request information via a network, the first communication apparatus transmitting the first connection request information to one or more apparatuses which are connected to the network which the first communication apparatus is connected to, the first connection request information including information of a network address of the first communication apparatus, information of a code indicative of communication with the communication apparatus, and information of a port number for the communication; and transmit second connection request information to the network address of the first communication apparatus in response to determination that the communication apparatus is an apparatus corresponding to the information of the code of the first connection request information, the second connection request information being information for establishing a connection to the first communication apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention. The components in the drawings are not necessarily to scale relative to each other.

FIG. 1 is a block diagram which schematically illustrates a configuration example of a learning support system according to an embodiment.

FIG. 2A is a front view which schematically illustrates an example of the external appearance of the learning support apparatus according to the embodiment.

FIG. 2B is a rear view which schematically illustrates an example of the external appearance of the learning support apparatus according to the embodiment.

FIG. 3 is a flowchart illustrating the outline of an example of a connection operation by an information terminal.

FIG. 4 is a flowchart illustrating the outline of an example of a connection operation by the learning support apparatus.

DETAILED DESCRIPTION OF THE INVENTION

Figure 5:
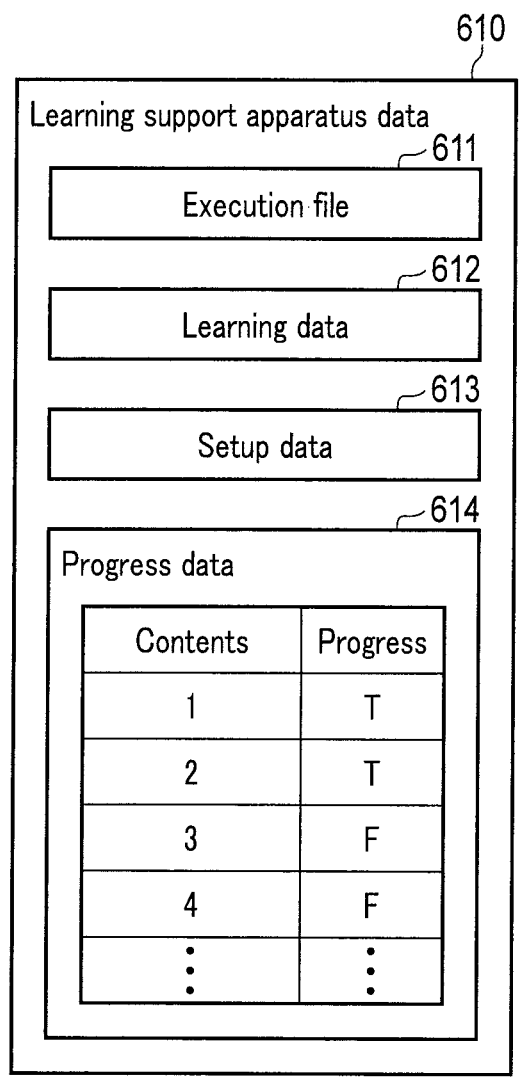
FIG. 5 is a view which schematically illustrates an example of learning support apparatus data.

An embodiment of the present invention will be described hereinafter with reference to the accompanying drawings. The present embodiment relates to a learning support system including a learning support apparatus. The learning support apparatus wirelessly communicates with an information terminal, such as a smartphone, in which software (application, app) associated with the learning support apparatus operates. The network of this system is constructed by using, for example, a wireless LAN standard such as Wi-Fi. The learning support apparatus can communicate with the information terminal via a household wireless LAN router. The learning support apparatus according to this embodiment operates independently or operates in cooperation with the information terminal, thereby supporting, for example, English learning of a user while having a dialogue with the user.

[Configuration of Learning Support System]

FIG. 1 schematically illustrates a configuration example of a learning support system 1 according to the embodiment. The learning support system 1 includes an information terminal 100, a learning support apparatus 200 and a router 300. The learning support system 1 forms one network including the information terminal 100 and learning support apparatus 200 by a wireless LAN connection, such as Wi-Fi, which uses, for example, the router 300 as an access point. Some other device 400, such as a personal computer (PC), a game console or electric appliances, may be connected to this network.

The information terminal 100 can be, for example, a smartphone, a tablet terminal or a personal computer (PC). Dedicated software (application) may be installed in the information terminal 100, and thereby the information terminal 100 cooperates with the learning support apparatus 200 which intercommunicates with the information terminal 100.

The information terminal 100 includes a terminal control circuit 112, a terminal recording circuit 114, a terminal communication device 120, a touch panel 130 and a display device 140. The terminal control circuit 112 includes, for example, a central processing unit (CPU), and controls various operations of the information terminal 100. The terminal recording circuit 114 stores programs and various data which are used in the terminal control circuit 112. The terminal communication device 120 wirelessly communicates with the router 300. This wireless communication is executed by using, for example, Wi-Fi standards. The touch panel 130 is provided on the display device 140, and acquires various inputs by the user's touch. The display device 140 includes, for example, a liquid crystal display (LCD), and displays various images.

The learning support apparatus 200 is an electronic apparatus for supporting learning English conversation, while having a dialogue with the user. The learning support apparatus 200 uses as an auxiliary device the information terminal 100 which intercommunicates the learning support apparatus 200. Specifically, the information terminal 100 functions, for example, as display means which displays a list of learning items of educational material contents of the learning support apparatus 200, a progress status, completion status, or as input means which inputs a learning item which the user wishes to acquire, or as download means which downloads update programs and additional contents of the learning support apparatus 200 from a dedicated server and transmits the downloaded programs and contents to the learning support apparatus 200.

FIG. 2A and FIG. 2B illustrate an example of the profile of the learning support apparatus 200. FIG. 2A is a front view of the learning support apparatus 200, and FIG. 2B is a rear view of the learning support apparatus 200. The learning support apparatus 200 according to the present embodiment has a shape like a small-sized robot. The learning support apparatus 200 includes a hemispherical head portion 282 which is formed of a semitransparent material, and a cylindrical body and leg portion 284.

In the inside of the head portion 282, there are provided a touch sensor 230, an upper LED 242 and lateral LEDs 244. The touch sensor 230 is a sensor for detecting a touch operation of the user on a top portion of the head portion 282. The touch sensor 230 includes, for example, an electrostatic capacitance sensor for detecting a touch operation, based on a variation in electrostatic capacitance. The upper LED 242 is a light source which lights an upper part of the head portion 282. The upper LED 242 includes color LEDs, and can perform lighting and flickering by a plurality of emission colors (e.g. red, blue, green and yellow). The lateral LEDs 244 are two light sources which are juxtaposed on the same level on the front surface of the head portion 282. In the learning support apparatus 200 in the shape of a small-sized robot, the lateral LEDs are recognized as the eyes of the robot. Like the upper LED 242, the lateral LED 244 includes color LEDs, and can perform lighting and flickering by a plurality of emission colors (e.g. red, blue, green and yellow).

On the back surface of the body and leg portion 284, there are provided a power button 262, a communication button 264, a volume button 266, etc. The power button 262 is a push button switch for operating the ON/OFF of the power to the learning support apparatus 200. The communication button 264 is a push button switch for operating the ON/OFF of wireless communication. The volume button 266 is a push button switch for setting the volume of sound that is output.

In addition, in the body and leg portion 284, a microphone 252 and a speaker 254 are provided. The microphone 252 generates, for example, a speech signal corresponding to the voice uttered by the user. The speaker 254 is a speaker for outputting a sound in associated with an exercise of an educational material for user's learning, and a response or the like for progressing the learning, for instance.

Besides, in the inside of the body and leg portion 284, there are provided an apparatus control circuit 212, an apparatus recording circuit 214, an apparatus communication device 220. The apparatus control circuit 212 operates in accordance with a control program stored in the apparatus recording circuit 214, and controls the operations of the respective parts of the learning support apparatus 200. In the present embodiment, the apparatus control circuit 212 does not use an operating system (OS) as used in general. The apparatus control circuit 212 controls the operation of the learning support apparatus 200 as a Non-OS apparatus. By configuring the learning support apparatus 200 as a Non-OS device, for example, reduction of cost can be achieved. The apparatus control circuit 212 includes, for example, a central processing unit (CPU), an application specific integrated circuit (ASIC) or a field programmable gate array (FPGA). The apparatus recording circuit 214 stores a control program for operating the apparatus control circuit 212 and an update program of the control program, and also stores educational material contents such as an English conversation lesson, the user's learning execution data (progress status, the completion status, etc.) relating to each educational material content. The apparatus communication device 220 wirelessly communicates with the router 300. This wireless communication is executed by using, for example, Wi-Fi standards.

[Operation of Learning Support System]

The operation of the learning support system 1 will be described. In particular, a description is given of an operation relating to the establishment of a connection of communication between the learning support apparatus 200 and information terminal 100, and an operation relating to the learning by the learning support apparatus 200.

<Connection Operation of Learning Support System>

An example of the operation relating to the establishment of communication of the information terminal 100 with the learning support apparatus 200 will be described with reference to a flowchart illustrated in FIG. 3. In the present embodiment, the information terminal 100, learning support apparatus 200 and other device 400 are connected by Wi-Fi communication to the router 300 functioning as the access point, thereby forming a wireless LAN network. As this wireless LAN network, for example, a network constructed in general homes is assumed. At this time, the information terminal 100, learning support apparatus 200 and other device 400 are connected to the router 300 as clients. In addition, IP addresses are automatically allocated by DHCP to the information terminal 100, learning support apparatus 200 and other device 400. Thus, the information terminal 100, learning support apparatus 200 and other device 400 do not have IP address information of other devices. In the present embodiment, in this situation, a connection is established between the information terminal 100 and learning support apparatus 200, and TCP communication is executed.

In the information terminal 100, when the activation of a dedicated application relating to the learning support apparatus 200 was selected, a process relating to the connection between the information terminal 100 and learning support apparatus 200 is executed. A process relating to the flowchart of FIG. 3 starts, for example, when the icon of the dedicated application was touched on the information terminal 100 which is, for example, a smartphone.

In step S101, the terminal control circuit 112 activates the dedicated application. In step S102, the terminal control circuit 112 configures a virtual host (TCP host) for executing TCP communication in a working memory area of the terminal control circuit 112. This virtual host temporarily functions as a server (TCP server) by entering a standby state to wait for second connection request information (to be described later) which is transmitted from the learning support apparatus 200, during a period from when the process for establishing a connection to the learning support apparatus 200 is started to when the connection is established. Incidentally, in step S102 in FIG. 3, for the purpose of convenience, the expression "Create server" is described in order to mean that the virtual host is configured in the working memory area and the virtual host is caused to function as the server.

In step S103, the terminal control circuit 112 transmits a specific character string to all devices in the wireless LAN network, to be more specific, by broadcast communication. In this communication, for example, UDP is used. The specific character string includes a "code indicative of the communication with the learning support apparatus 200" and a "port number for TCP communication". The specific character string is, for example, "LessonPodConnectionRequest52000". "LessonPodConnectionRequest" is the code, and "52000" is the port number. It is assumed that the information which is transmitted here is referred to as "first connection request information." The learning support apparatus 200, which received the first connection request information, can discriminate by this code that the first connection request information is the information addressed to this own apparatus. Even if the other device 400 receives the first connection request information, the other device 400 ignores this information. Besides, in the UDP communication, the information of the IP address of the information terminal 100 is also transmitted. If the UDP communication is used, a simple communication can be transmitted to an unspecified IP address, but the stability of UDP communication is lower than the stability of TCP communication.

In step S104, as will be described later, the terminal control circuit 112 determines whether second connection request information has been received or not, the second connection request information being transmitted from the learning support apparatus 200 which received the first connection request information. The second connection request information is information relating to a request for TCP connection. When the second connection request information has not been received, the process repeats step S104 and the terminal control circuit 112 stands by. At this time, the terminal control circuit 112 repeatedly transmits the first connection request information by a predetermined number of times (e.g. three times) at predetermined time intervals (e.g. every second) until receiving the second connection request information. If the terminal control circuit 112 cannot receive the second connection request information despite transmitting the first connection request information by the predetermined number of times (e.g. three times), the terminal control circuit 112 may terminate the present connection process. When the terminal control circuit 112 received the second connection request information, the process advances to step S105.

In step S105, based on the second connection request information, the terminal control circuit 112 establishes a connection between the information terminal 100 and learning support apparatus 200 via the TCP host. The established communication between the information terminal 100 and learning support apparatus 200 is communication using TCP for which stable communication can be expected. By the above, the connection process executed by the information terminal 100 is terminated.

Next, a connection process executed by the learning support apparatus 200 will be described with reference to a flowchart illustrated in FIG. 4.

In step S201, the apparatus control circuit 212 determines whether the power button 262 was pressed and the power switch was turned on. When the power switch is not turned on, the process repeats step S201 and the apparatus control circuit 212 stands by. On the other hand, when the power switch was turned on, the process advances to step S202. At this time, the learning support apparatus 200 and router 300 do not execute Wi-Fi communication.

In step S202, the apparatus control circuit 212 causes the upper LED 242 to flicker in white, and stands by without a connection to the network. The flickering of the upper LED 242 in white indicates that Wi-Fi is in the OFF state. By the white flickering of the upper LED 242, the user can recognize that the learning support apparatus 200 is not connected to the network.

In step S203, the apparatus control circuit 212 determines whether the communication button 264 was pressed and the Wi-Fi switch was turned on. When the communication button 264 is not pressed, the process returns to step S202 and the learning support apparatus 200 continues the standby for Wi-Fi connection and the white flickering of the upper LED 242. On the other hand, when the communication button 264 was pressed, the process advances to step S204.

In step S204, the apparatus control circuit 212 establishes a connection by Wi-Fi, with the router 300 functioning as the access point. In addition, at this time, the apparatus control circuit 212 causes the upper LED 242 to flicker in blue. The blue flickering of the upper LED 242 indicates that the Wi-Fi connection between the learning support apparatus 200 and the router 300 is established and the learning support apparatus 200 is connected to the network, but that the learning support apparatus 200 is not connected to the information terminal 100. By the blue flickering of the upper LED 242, the user can recognize that the learning support apparatus 200 is connected to the network but is not connected to the information terminal 100.

In step S205, the apparatus control circuit 212 determines whether or not the above-described first connection request information, which is transmitted from the information terminal 100, has been received. Whether the information by the UDP communication is the first connection request information or not is determined based on the code included in the first connection request information. When the first connection request information is not received, the process returns to step S204 and the apparatus control circuit 212 stands by until receiving the first connection request information. On the other hand, when the first connection request information was received, the process advances to step S206. By the reception of the first connection request information, the learning support apparatus 200 can acquire the IP address and the port number of the information terminal 100.

In step S206, the apparatus control circuit 212 tries a connection using TCP to the TCP host of the information terminal 100, by using the acquired IP address and the port number of the information terminal 100. It is assumed that the information transmitted from the learning support apparatus 200 to the information terminal 100 at this time is referred to as "second connection request information". Specifically, the apparatus control circuit 212 transmits the second connection request information to the information terminal 100.

In step S207, the apparatus control circuit 212 determines whether the connection between the learning support apparatus 200 and information terminal 100 was established by the transmission of the second connection request information. If the connection is not established, the process returns to step S204 and the apparatus control circuit 212 repeats the process of steps S204 to step S207. On the other hand, when the connection was established, the process advances to step S208.

In step S208, since the communication with the information terminal 100 has been established, the apparatus control circuit 212 lights the upper LED 242 in bright blue so as to indicate the establishment of the communication. By the bright blue lighting of the upper LED 242, the user can recognize that the learning support apparatus 200 is connected to the information terminal 100. By the above, the connection process which is executed by the learning support apparatus 200 is terminated. As described above, the communication by TCP is established between the information terminal 100 and learning support apparatus 200.

As described above, the learning support system 1 functioning as the communication system includes the information terminal 100 functioning as a first communication apparatus and the learning support apparatus 200 functioning as a second communication apparatus, which are connected to the network by the wireless LAN. The information terminal 100 functioning as the first communication apparatus configures the virtual TCP host for executing communication. The information terminal 100 transmits the first connection request information to one or more apparatuses which include the learning support apparatus 200 functioning as the second communication apparatus and are connected to the network. The first connection request information includes information of the IP address as the network address of the information terminal 100, information of the code indicative of the communication with the learning support apparatus 200 as the second communication apparatus, and information of the port number for TCP communication. The learning support apparatus 200 functioning as the second communication apparatus receives the first connection request information which the information terminal 100 transmitted. Upon determining that the own apparatus is the second communication apparatus corresponding to the information of the code of the first connection request information, the learning support apparatus 200 transmits to the IP address of the information terminal the second connection request information for establishing the connection to the information terminal 100 via the TCP host. The information terminal 100 functioning as the first communication apparatus receives the second connection request information which the learning support apparatus 200 transmitted, and establishes the connection to the learning support apparatus 200 via the TCP host in response to the reception of the second connection request information.

Here, the example was described in which the information terminal 100 and learning support apparatus 200 communicate via the router 300. Specifically, only the case was described in which the information terminal 100 and learning support apparatus 200 operate in the client mode. However, in the learning support system 1, the connection method is not limited to this, and other methods may be employed. For example, the learning support apparatus 200 may function as an access point. The learning support apparatus 200 may operate in an infrastructure mode, and the information terminal 100 that operates in the client mode may be connected thereto. Alternatively, the information terminal 100 and learning support apparatus 200 may operate in an ad-hoc mode and may be connected to each other. For example, the connection methods may switch when the communication button 264 is pressed for a long time.

<Operation of Learning Mode>

In the learning support apparatus 200, the determination of transition to various operation modes and the processes relating to operations in various operation modes are executed in parallel with the connection process illustrated in FIG. 4. For example, while the connection process is being executed or when the connection process is not executed, if a predetermined condition is satisfied, the learning support apparatus 200 enters a predetermined mode. The predetermined condition is, for example, that words uttered by the user are acquired by the microphone 252, the words are speech-recognized by the apparatus control circuit 212, and the recognized result is determined to be predetermined words. For example, if the predetermined words are "Start lesson" and if the words "Start lesson" were detected, the learning support apparatus 200 may shift to the learning mode. In addition, if the predetermined words are "What time is it now?" and the words "What time is it now?" were detected, the speaker 254 may output a speech corresponding to the present time, for example, a speech "It is ten minutes past three". Aside from the speech recognition, for example, the pressing of a predetermined button may be set as a predetermined condition. When this button was pressed, the learning support apparatus 200 may shift to the learning mode.

In the learning mode, the learning support apparatus 200 performs dialogue-type learning in accordance with the educational material contents stored in the apparatus recording circuit 214. This learning operation is performed even when the learning support apparatus 200 and information terminal 100 are not connected.

For example, the dialogue-type learning is performed in the following manner. To begin with, the learning support apparatus 200 outputs a speech "Which lesson will you start?" from the speaker 254, and stands by for a response from the user. At this time, for example, during the playback of a conversation speech in which a speech is being output from the speaker 254, the lateral LEDs 244 representing the eyes are flickered in blue like blinking. Besides, at a time of standby for a speech input and waiting for the user's response, the lateral LEDs 244 are flickered in green. By viewing the green flickering, the user can recognize that the learning support apparatus 200 waits for a response. The flickering can be a repetition of a cycle of, for example, 2-second turn-on, 0.5-second turn-off, 2-second turn-on, 0.5-second turn-off, 0.5-second turn-on and 0.5-second turn-off.

Assume now that the user uttered, for example, "Lesson 3". At this time, the learning support apparatus 200 acquires the user's voice by the microphone 252, and speech-recognizes the user's voice. Based on the result of speech recognition, the learning support apparatus 200 outputs from the speaker 254 a speech "If Lesson 3 is correct, say 'Yes' or touch the head", and waits for the user's response or touch. At this time, the learning support apparatus 200 stands by for a speech input. Thus, the lateral LEDs 244 flickers in green. The upper LED 242 also flickers in order to indicate that the learning support apparatus 200 waits for a touch input to the touch sensor 230.

When the user touched, for example, a top portion of the learning support apparatus 200, the touch sensor 230 detects this touch. At this time, the learning support apparatus 200 outputs from the speaker 254 a speech "Read the text of Lesson 3. Upon finishing, touch the head", and then stands by for the user's touch. At this time, the upper LED 242 flickers in green in order to indicate that the learning support apparatus 200 waits for a touch input to the touch sensor 230. Meanwhile, the lateral LEDs 244 are turned off.

For example, when the user has finished reading the text and touched the top portion of the learning support apparatus 200, the touch sensor 230 detects this touch. At this time, the learning support apparatus 200 outputs from the speaker 254 a speech of educational material of Lesson 3 as a good example. At this time, the lateral LEDs 244 flickers in yellow, thereby to indicate that the speech of the educational material is being played back. Thereafter, the learning support apparatus 200 progresses the learning to Lesson 4. Specifically, the learning support apparatus 200 outputs from the speaker 254 a speech "Read the text of Lesson 4. Upon finishing, touch the head", and stands by for the user's touch. Subsequently, the learning support apparatus 200 similarly progresses the learning until the user finishes the learning.

The learning support apparatus 200 records the progress status of learning in the apparatus recording circuit 214. FIG. 5 illustrates a configuration example of learning support apparatus data 610 recorded in the apparatus recording circuit 214. The learning support apparatus data 610 includes an execution file 611 for executing the operation of the learning support apparatus 200, learning data 612 including learning contents, and setup data 613 including various settings of the learning support apparatus 200.

The learning support apparatus data 610 further includes progress data 614 indicating the progress status of the user's learning. The progress data 614 includes information of "T" indicating that learning was completed or information of "F" indicating that learning is not completed with respect to each of contents such as Lessons 1, 2 and 3. By referring to this progress data, the learning support apparatus 200 can start learning from the continuation of the previous learning, or can show contents which are yet to be learned.

Figure 6:
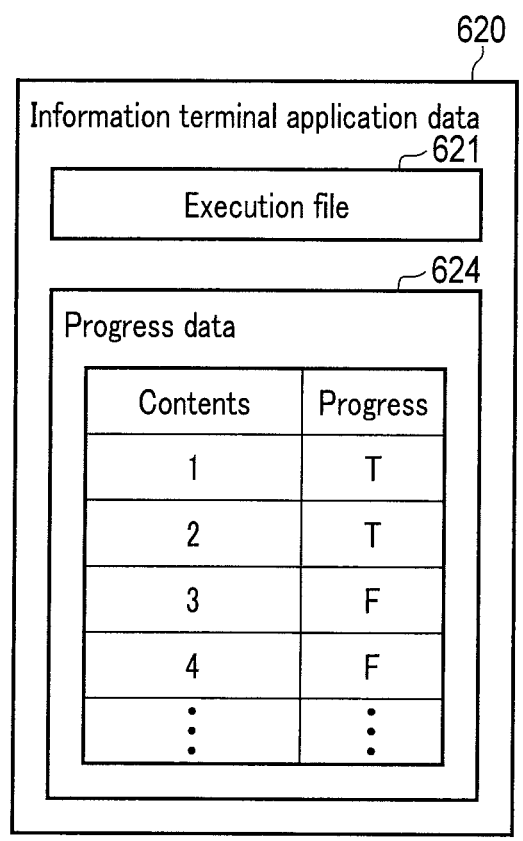
FIG. 6 is a view which schematically illustrates an example of information terminal application data.

In the present embodiment, the information relating to the progress status of learning is also included in the data relating to the application of the information terminal 100, which cooperates with the learning support apparatus 200. FIG. 6 illustrates a configuration example of information terminal application data 620 which is recorded in the terminal recording circuit 114 of the information terminal 100. The information terminal application data 620 includes an execution file 621 for executing the application, and progress data 624 having the same configuration as the progress data 614 of the learning support apparatus 200. When the learning support apparatus 200 and information terminal 100 communicate with each other, the progress data 614 of the learning support apparatus 200 and the progress data 624 of the information terminal 100 are synchronized. If the learning has progressed only in the learning support apparatus 200 while the learning support apparatus 200 and information terminal 100 do not communicate, the progress data 624 recorded in the information terminal 100 is updated in accordance with the progress data 614 of the learning support apparatus 200 when the learning support apparatus 200 and information terminal 100 are next connected. By referring to the progress data 624, the information terminal 100 can display the progress status of learning on the display device 140. While confirming the progress status with use of the information terminal, the user can progress the learning, for example, by selecting the content.

<Screen Transition of Information Terminal>

Referring to FIG. 7A to FIG. 7D, a description will be given of examples of the screen displayed on the display device 140 of the information terminal 100 in which the application is being activated.

Figure 7A:
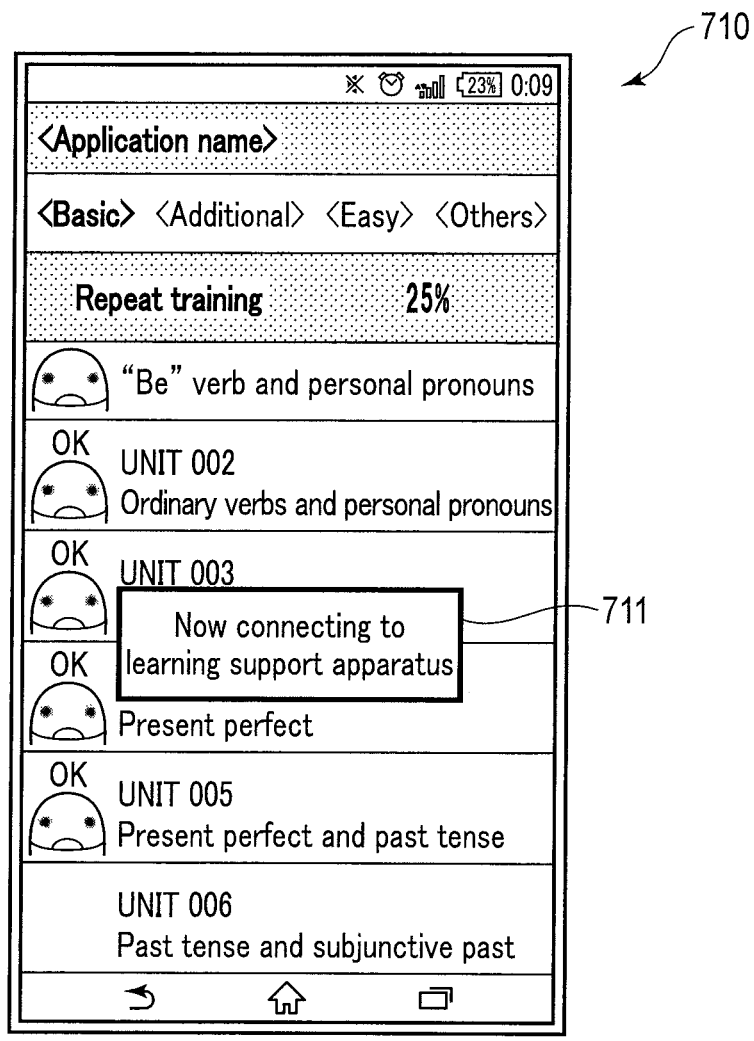
FIG. 7A is a view illustrating an example of a screen which is displayed on the information terminal when the information terminal is executing a connection process for a connection to the learning support apparatus.

FIG. 7A illustrates an example of a screen 710 at a time when the application is activated. When the application is activated, a process relating to a connection to the learning support apparatus 200 is executed. Thus, the screen 710 shown in FIG. 7A includes display 711 indicating "Now connecting to learning support apparatus". Needless to say, of this display 711, a part "learning support apparatus" may be, for example, a nickname of the learning support apparatus 200.

The process of connection to the learning support apparatus 200 may be executed not only when the application is activated, but may also be executed by an operation by the user. The operation by the user is, for example, an operation that an icon "Connect to learning support apparatus" is touched while the application is running. In this case, during the connection process, the screen 710 as illustrated in FIG. 7A is displayed on the display device 140 of the information terminal 100. The display of the screen 710 has no relation to which operation the learning support apparatus 200 is executing.

In the example shown in FIG. 7A, the case is illustrated in which when the application is activated, a list of contents relating to learning is displayed. The screen displayed when the application is activated may be, aside from the list of contents, a screen indicating the progress status of each of categories such as "repeat training", "pronunciation training", "grammar training" and "practical conversation library", or may be a screen showing a list of phrases. The screen at the time of activation may be, for example, the screen at the time when the application was previously terminated.

Figure 7B:
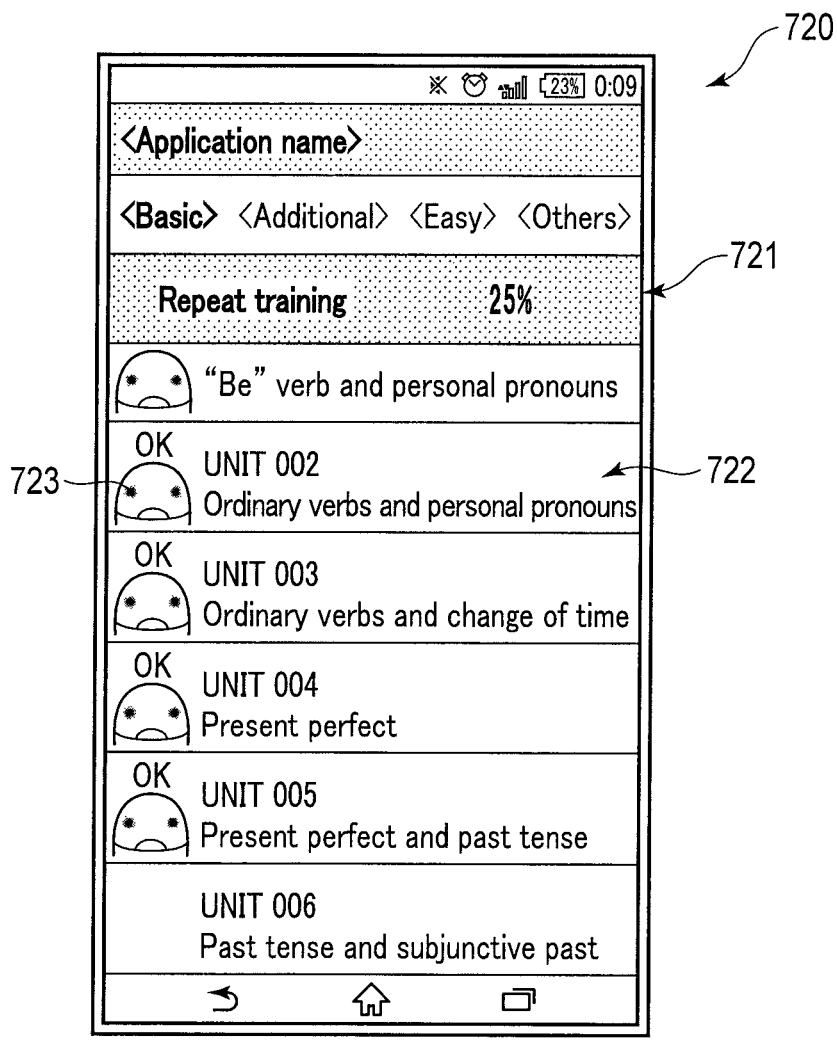
FIG. 7B is a view illustrating an example of a screen which is displayed on the information terminal when the connection to the learning support apparatus was established and when the learning support apparatus is not in a learning mode.

FIG. 7B illustrates an example of a screen 720 which is displayed on the display device 140 of the information terminal 100 when the connection between the learning support apparatus 200 and information terminal 100 was established and when the state of the learning support apparatus 200 is not the learning mode. The example of the screen 720 shown in FIG. 7B includes display 721 indicating that the repeat training is being performed and the progress ratio of the repeat training is 25%. In addition, this screen 720 includes a list 722 of contents included in the repeat training. Completion icons 723 indicate that, of the contents displayed in the list, UNIT 001 to UNIT 005 have been completed. Since the learning of UNIT 006 is not completed, the completion icon 723 is not displayed for the UNIT 006.

Figure 7C:
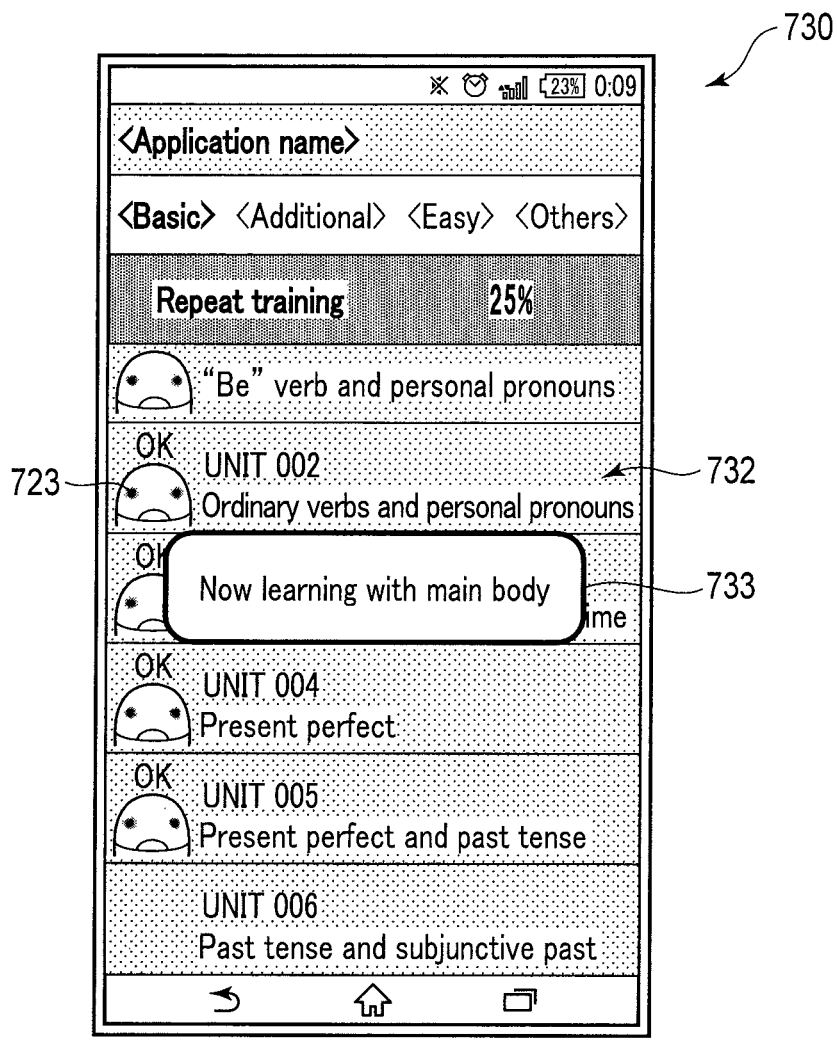
FIG. 7C is a view illustrating an example of a screen which is displayed on the information terminal when the connection to the learning support apparatus was established and when the learning support apparatus is in the learning mode.

When the screen of FIG. 7B is displayed on the display device 140, that is, when the learning support apparatus 200 is not in the learning mode, the user can select learning by using the learning support apparatus 200 by touching any one of the contents displayed in the list 722 of the screen 720. When any one of the contents displayed on the list 722 was touched, the information of the selected content is transmitted to the learning support apparatus 200, and the learning support apparatus 200 starts the learning operation relating to this content. At this time, for example, a screen 730 as illustrated in FIG. 7C is displayed on the display device 140. In the screen 730 shown in FIG. 7C, the display of a list 732 of contents is changed so as to become less conspicuous, for example, by the brightness being lowered or the color being changed, and display 733 "Now learning with main body" is effected. When the learning support apparatus 200 is operating in the learning mode, the communication button 264 is disabled. When the learning mode is ended, the communication button 264 is enabled once again.

In a case where the screen 710 shown in FIG. 7A is displayed and the connection process is being executed between the learning support apparatus 200 and information terminal 100 resulting that the connection is established between learning support apparatus 200 and information terminal 100 and where the learning support apparatus 200 is in the learning mode, the screen 730 shown in FIG. 7C is displayed on the display device 140 of the information terminal 100.

Figure 7D:
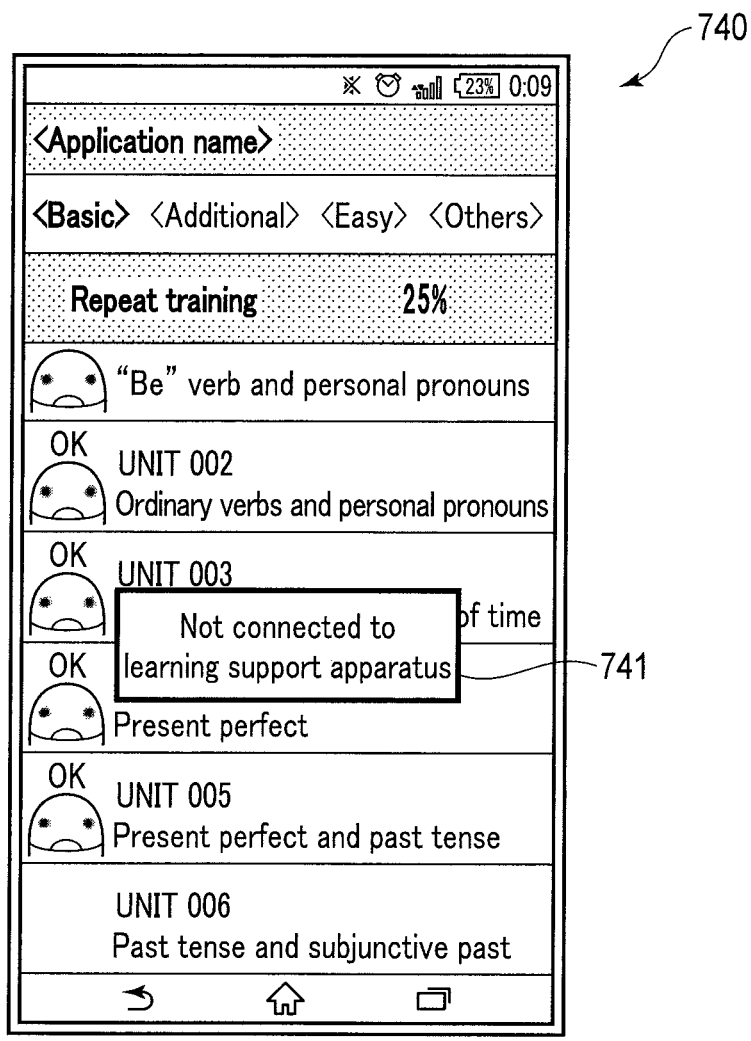
FIG. 7D is a view illustrating an example of a screen which is displayed on the information terminal when the connection to the learning support apparatus is not established and when contents was selected.

In a case where the connection between the learning support apparatus 200 and information terminal 100 failed although the screen 710 shown in FIG. 7A is displayed and the connection process is executed between the learning support apparatus 200 and information terminal 100, the screen 720 shown in FIG. 7B, for instance, is displayed on the display device 140 of the information terminal 100. If the display of any one of the contents in the list 722 is touched when the connection between the learning support apparatus 200 and information terminal 100 is not established, a screen 740 as illustrated in FIG. 7D, for instance, is displayed. Specifically, the screen 740 includes display 741 "Not connected to learning support apparatus."

In the present embodiment, the establishment of TCP communication is requested between the information terminal 100 and learning support apparatus 200. Here, IP addresses are automatically allocated by DHCP to the information terminal 100 and learning support apparatus 200, respectively. Thus, each of the information terminal 100 and learning support apparatus 200 does not have the information of the IP address of the other apparatus. In order to establish TCP communication under this condition, there is a method of registering the apparatuses in a DNS, or a method of using a multicast DNS such as Avahi or Bonjour. However, a private DNS server is rarely provided in a network which is assumed to be used in general homes. In addition, the multicast DNS is software that runs on an OS, and it is difficult to install the multicast DNS in a non-OS apparatus such as the learning support apparatus 200 of the present embodiment. In this situation, the learning support system 1 according to this embodiment executes the characteristic connection process as illustrated in FIG. 3 and FIG. 4. According to the method of this embodiment, the establishment of TCP communication can easily and exactly be realized under the above condition.

In the above-described embodiment, by way of example, the case was described in which the number of learning support apparatuses 200 on the network is one, but there is no limitation to this. A plurality of learning support apparatuses 200 having the same configuration may exist on the network. In this case, each of the learning support apparatuses 200, which received the first connection request information, transmits the second connection request information. In this case, the information terminal 100 may establish TCP communication with the learning support apparatus 200 relating to the second connection request information which the information terminal 100 first received.

In the above embodiment, by way of example, the connection between the learning support apparatus and information terminal was described, but there is no limitation to this. The technique of this embodiment is applicable to various communication apparatuses. Moreover, in the above embodiment, by way of example, the network using a wireless LAN was described, but there is no limitation to this. The technique of this embodiment is applicable to various network configurations.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus comprising:
a processor, and a memory storing instructions that, when the processor executes the instructions, cause the processor to:
transmit first connection request information, which includes information of a network address of the communication apparatus, information of a code indicative of communication with at least one first communication apparatus, and information of a port number for the communication, to one or more apparatuses which are connected to a network which the communication apparatus is connected to;
receive second connection request information which is information that one of the at least one first communication apparatus corresponding to the information of the code of the first connection request information transmits to the network address of the communication apparatus in response to reception of the first connection request information; and
establish a connection to the one first communication apparatus in response to reception of the second connection request information.

2. The communication apparatus according to claim 1, wherein when a plurality of the first communication apparatuses corresponding to the information of the code are connected to the network, the processor, under control of the instructions, establishes a connection to one of the plurality of the first communication apparatuses, the one first communication apparatus transmitting the second connection request information that the communication apparatus first receives after transmitting the first connection request information.

3. The communication apparatus according to claim 1, wherein the processor, under control of the instructions, further:
configures a host for executing communication; and
establishes the connection to the one first communication apparatus via the host; and
wherein
the host which is configured in the communication apparatus is a host for executing TCP communication,
the network address is an IP address,
the port number is a port number for TCP communication,
the communication that is established between the communication apparatus and the one first communication apparatus is communication by TCP, and
the first connection request information is transmitted and received by using communication by UDP.

4. The communication apparatus according to claim 1, wherein the communication apparatus and the at least one first communication apparatus are connected to the network by a wireless LAN.

5. A communication apparatus comprising:
a processor, and a memory storing instructions that, when the processor executes the instructions, cause the processor to:
receive first connection request information via a network, a first communication apparatus transmitting the first connection request information to one or more apparatuses which are connected to the network which the first communication apparatus is connected to, the first connection request information including information of a network address of the first communication apparatus, information of a code indicative of communication with the communication apparatus, and information of a port number for the communication; and
transmit second connection request information to the network address of the first communication apparatus in response to determination that the communication apparatus is an apparatus corresponding to the information of the code of the first connection request information, the second connection request information being information for establishing a connection to the first communication apparatus.

6. The communication apparatus according to claim 5, wherein the first communication apparatus further configures a host for executing communication and establishes the connection to the communication apparatus via the host, and
wherein
the host configured in the first communication apparatus is a host for executing TCP communication,
the network address is an IP address,
the port number is a port number for TCP communication,
the communication that is established between the first communication apparatus and the communication apparatus is communication by TCP, and
the first connection request information is transmitted and received by using communication by UDP.

7. The communication apparatus according to claim 5, wherein the first communication apparatus and the communication apparatus are connected to the network by a wireless LAN.

8. A communication system comprising a first communication apparatus and a second communication apparatus,
the first communication apparatus comprising:
a first processor, and a first memory storing first instructions that, when the first processor executes the first instructions, cause the first processor to:
transmit first connection request information, which includes information of a network address of the first communication apparatus, information of a code indicative of communication with the second communication apparatus and information of a port number for the communication, to one or more apparatuses which are connected to a network; and
the second communication apparatus comprising:
a second processor, and a second memory storing second instructions that, when the second processor executes the second instructions, cause the second processor to:
receive via the network the first connection request information which the first communication apparatus transmits; and
transmit second connection request information to the network address of the first communication apparatus in response to determination that the second communication apparatus is an apparatus corresponding to the information of the code of the first connection request information, the second connection request information being information for establishing a connection to the first communication apparatus,
wherein the first processor of the first communication apparatus, under control of the first instructions, receives the second connection request information which the second communication apparatus transmits, and establishes a connection to the second communication apparatus in response to reception of the second connection request information.

9. The communication system according to claim 8, wherein the first communication apparatus further configures a host for executing communication and establishes the connection to the second communication apparatus via the host, and
wherein the host configured in the first communication apparatus is a host for executing TCP communication,
the network address is an IP address,
the port number is a port number for TCP communication,
the communication that is established between the first communication apparatus and the second communication apparatus is communication by TCP, and
the first connection request information is transmitted and received by using communication by UDP.

10. The communication system according to claim 8, wherein
the network includes an access point, and
the first communication apparatus and the second communication apparatus are connected to the access point by a wireless LAN.

11. A communication method for establishing a connection between a first communication apparatus and a second communication apparatus, the method for the second communication apparatus comprising:
receiving first connection request information via a network, the first communication apparatus transmitting the first connection request information to one or more apparatuses which are connected to the network which the first communication apparatus is connected to, the first connection request information including information of a network address of the first communication apparatus, information of a code indicative of communication with the communication apparatus, and information of a port number for the communication; and
transmitting second connection request information to the network address of the first communication apparatus in response to determination that the communication apparatus is an apparatus corresponding to the information of the code of the first connection request information, the second connection request information being information for establishing a connection to the first communication apparatus.

12. The communication method according to claim 11, wherein the first communication apparatus configures a host for executing communication and establishes the connection to the second communication apparatus via the host, and
wherein
the host configured in the first communication apparatus is a host for executing TCP communication,
the network address is an IP address,
the port number is a port number for TCP communication,
the communication that is established between the first communication apparatus and the second communication apparatus is communication by TCP, and
the first connection request information is transmitted and received by using communication by UDP.

13. A non-transitory recording medium having a program recorded thereon for establishing a connection between a first communication apparatus and a second communication apparatus, the program being executable to control a computer, the computer being a computer of the second communication apparatus, the program causing the computer to:
receive first connection request information via a network, the first communication apparatus transmitting the first connection request information to one or more apparatuses which are connected to the network which the first communication apparatus is connected to, the first connection request information including information of a network address of the first communication apparatus, information of a code indicative of communication with the communication apparatus, and information of a port number for the communication; and
transmit second connection request information to the network address of the first communication apparatus in response to determination that the communication apparatus is an apparatus corresponding to the information of the code of the first connection request information, the second connection request information being information for establishing a connection to the first communication apparatus.

14. The non-transitory recording medium according to claim 13,
wherein the first communication apparatus configures a host for executing communication and establishes the connection to the second communication apparatus via the host, and
wherein
the host configured in the first communication apparatus is a host for executing TCP communication,
the network address is an IP address,
the port number is a port number for TCP communication,
the communication that is established between the first communication apparatus and the second communication apparatus is communication by TCP, and
the first connection request information is transmitted and received by using communication by UDP.

* * * * *